United States Patent
You et al.

(10) Patent No.: US 12,366,011 B1
(45) Date of Patent: Jul. 22, 2025

(54) CUT-RESISTANT MULTIFUNCTIONAL MELT-SPUN COMPOSITE FIBER, AND FABRICATION METHOD AND APPLICATION THEREOF

(71) Applicant: Yancheng Labon Technical Textile Group Co., Ltd., Yancheng (CN)

(72) Inventors: Xiulan You, Yancheng (CN); Junrong Qu, Yancheng (CN); Hanyue Xu, Yancheng (CN); Chunming Shi, Yancheng (CN)

(73) Assignee: Yancheng Labon Technical Textile Group Co., Ltd., Yancheng (CN)

( * ) Notice: Subject to any disclaimer, the term of this patent is extended or adjusted under 35 U.S.C. 154(b) by 0 days.

(21) Appl. No.: 18/673,375

(22) Filed: May 24, 2024

(51) Int. Cl.
| | |
|---|---|
| *D01F 6/04* | (2006.01) |
| *C08J 3/22* | (2006.01) |
| *C08K 3/04* | (2006.01) |
| *C08K 7/26* | (2006.01) |
| *D01D 1/00* | (2006.01) |
| *D01D 5/088* | (2006.01) |
| *D01F 1/10* | (2006.01) |
| *D01F 6/62* | (2006.01) |
| *C08K 3/34* | (2006.01) |

(52) U.S. Cl.
CPC ............... *D01F 1/10* (2013.01); *C08J 3/226* (2013.01); *C08K 3/041* (2017.05); *C08K 7/26* (2013.01); *D01D 1/00* (2013.01); *D01D 5/088* (2013.01); *D01F 6/04* (2013.01); *D01F 6/62* (2013.01); *C08J 2323/06* (2013.01); *C08J 2323/12* (2013.01); *C08J 2367/02* (2013.01); *C08K 2003/343* (2013.01); *C08K 2201/001* (2013.01); *C08K 2201/003* (2013.01); *C08K 2201/011* (2013.01); *D10B 2321/0211* (2013.01); *D10B 2331/04* (2013.01); *D10B 2401/063* (2013.01)

(58) Field of Classification Search
CPC ... D02G 3/442; D01F 6/04; D10B 2321/0211; C08K 7/26; C08K 3/041; C08K 2201/011
See application file for complete search history.

(56) References Cited

U.S. PATENT DOCUMENTS

| | | | |
|---|---|---|---|
| 2011/0171468 A1* | 7/2011 | Tam | D01D 5/08 428/372 |
| 2021/0102313 A1* | 4/2021 | Marissen | D01F 11/06 |
| 2021/0115596 A1* | 4/2021 | Marissen | D02G 3/442 |
| 2023/0416945 A1* | 12/2023 | Marissen | D02G 3/442 |

FOREIGN PATENT DOCUMENTS

| | | | | |
|---|---|---|---|---|
| JP | 2003119614 A | * | 4/2003 | ............ C08F 210/06 |

* cited by examiner

*Primary Examiner* — Karuna P Reddy
(74) *Attorney, Agent, or Firm* — JC ONE WORLD

(57) ABSTRACT

Disclosed in the present disclosure are a cut-resistant multifunctional melt-spun composite fiber, and a fabrication method and application thereof. Porous zeolite, a carbon nanotube and an ultra-high molecular weight polyethylene microfiber are taken as a composite functional substrate. A special crystal structure of the porous zeolite in a fiber allows the fiber to have a larger stress field and stronger adsorption performance on vapor molecules in an environment. The carbon nanotube has excellent electrical conductivity, endowing the fiber with an antistatic effect, and a tubular structure of the carbon nanotube effectively reduces material density, such that light weight of the fiber is achieved. Finally, the ultra-high molecular weight polyethylene microfiber selected by the present disclosure can improve fiber strength and performance stability, and further forms a synergistic effect together with the porous zeolite and the carbon nanotube, such that the obtained fiber product has diversified functions.

8 Claims, 1 Drawing Sheet

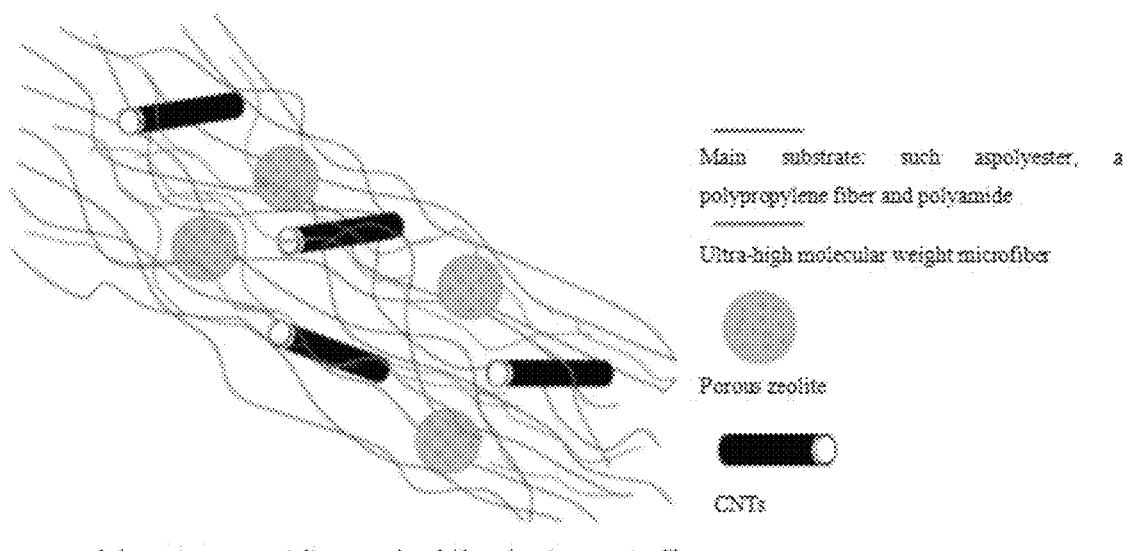
Schematic structural diagram of multifunctional composite fiber

CUT-RESISTANT MULTIFUNCTIONAL MELT-SPUN COMPOSITE FIBER, AND FABRICATION METHOD AND APPLICATION THEREOF

TECHNICAL FIELD

The present disclosure belongs to the technical field of cut-resistant fibers, and particularly relates to a cut-resistant multifunctional melt-spun composite fiber, and a fabrication method and application thereof.

BACKGROUND

Cut-resistant fibers are increasingly being used in modern engineering and technology, and play a vital role in a number of areas, especially in safety and security, aerospace, automotive manufacturing, the marine industry and sports equipment. These fields place high demands on the strength, durability, and lightness of materials, and the cut-resistant fibers are highly sought after for their excellent physical properties. However, current substrate selection for cut-resistant fibers relies heavily on ultra-high molecular weight fibers (UHMWF). Such a reliance not only comes at a high cost, but also makes the production process complex and difficult to control.

The ultra-high molecular weight fibers have dominated the cut-resistant fibers market with their excellent mechanical properties and cut-resistant characteristics. However, such fibers are expensive to produce, mainly due to their complex preparation process and stringent production conditions. Moreover, the production process of the ultra-high molecular weight fibers requires high-precision equipment and technical support. Furthermore, due to the special characteristics of the ultra-high molecular weight fibers, it is difficult to control the production technology that often needs to be carried out under specific temperatures and pressures, which further increases the production costs and production difficulties.

Besides the problems of cost and production difficulty, the cut-resistant fiber products relying on the ultra-high-molecular weight fibers also suffer from the problem of functional homogeneity, singularity, or uniformity. Due to the limitation of the nature of the ultra-high molecular weight fibers, the fabricated cut-resistant fibers tend to have only a single cut-resistant property and lack other functions, such as an anti-static function, a fire prevention function, and a high-temperature resistance function. This homogeneity limits the application of the cut-resistant fibers in more fields, especially in some occasions with more demanding requirements on material properties, such as industrial production and military equipment in high temperature environments.

SUMMARY

An objective of this section is to summarize some aspects of examples of the present disclosure and briefly introduce some preferred examples. Simplifications or omissions may be made in this section, as well as in the abstract and the invention title of the present application, to avoid obscuring the purpose of this section, the abstract and the invention title, and such simplifications or omissions should not be used to limit the scope of the present disclosure.

In view of the above and/or problems existing in the prior art, the present disclosure is provided.

Accordingly, an object of the present disclosure is to overcome the defects of the prior art and to provide a cut-resistant multifunctional melt-spun composite fiber.

In order to solve the technical problems, the present disclosure provides the following technical solution: the multifunctional melt-spun composite fiber has a flexible network structure and includes: a porous zeolite, a carbon nanotube and an ultra-high molecular weight polyethylene microfiber as a composite functional substrate, and a conventional melt-spun fiber as a main fiber substrate. a total content of the composite functional substrate accounts for 0.5% to 10% of the multifunctional melt-spun composite fiber.

As a preferred solution of the cut-resistant multifunctional melt-spun composite fiber according to the present disclosure, in the composite functional substrate, a usage ratio of a amount of the ultra-high molecular weight polyethylene microfiber to a total amount of the porous zeolite and the carbon nanotube ranges from 2:1 to 5:1.

As a preferred solution of the cut-resistant multifunctional melt-spun composite fiber according to the present disclosure, a usage ratio of the porous zeolite to the carbon nanotube in the composite functional substrate ranges from 1:1 to 3:1.

As a preferred solution of the cut-resistant multifunctional melt-spun composite fiber according to the present disclosure, the ultra-high molecular weight polyethylene microfiber has a diameter, which ranges from 2 μm to 4 μm, a length, which ranges from 20 μm to 40 μm, a degree of molecular polymerization, which ranges from 1.5 million to 3 million, and a melting point, which ranges from 130° C. to 136° C.

As a preferred solution of the cut-resistant multifunctional melt-spun composite fiber according to the present disclosure, a particle size of the porous zeolite ranges from 2000 mesh to 2500 mesh.

As a preferred solution of the cut-resistant multifunctional melt-spun composite fiber according to the present disclosure, the carbon nanotube has a diameter, which ranges from 2 nm to 4 nm, a length, which ranges from 20 μm to 40 μm, and a volume resistivity ≤100Ω.

As a preferred solution of the cut-resistant multifunctional melt-spun composite fiber according to the present disclosure, the conventional melt-spun fiber includes one of polyester, a polyethylene fiber, a polypropylene fiber, or polyamide.

Another objective of the present disclosure is to provide a fabrication method of the cut-resistant multifunctional melt-spun composite fiber.

In order to solve the technical problems, the present disclosure provides the following technical solution: the multifunctional melt-spun composite fiber is obtained by blending and melt spinning masterbatch A containing porous zeolite and a carbon nanotube and masterbatch B containing an ultra-high molecular weight polyethylene microfiber. The fabrication method includes: uniformly mix the masterbatch A, the masterbatch B, and a carrier particle at a temperature ranges from 50° C. to 70° C. and obtain a blended particles. The carrier particle comprises one of a polyethylene terephthalate (PET) particle, or a polypropylene particle. This step controls a total content of a composite functional substrate contained in the masterbatch A and the masterbatch B to be in a range from 0.5% to 10% of the total content of the multifunctional melt-spun composite fiber. The step controls a content of the ultra-high molecular weight polyethylene microfiber in masterbatch B to be in a range from 50% to 85% of the total content of composite functional substrate; and adding the blended particles into a polymer hopper, extruding the blended particles by a twin screw extruder at a temperature ranges from 250° C. to 300° C., cooling, drawing and winding the blended particles, and obtaining finished filaments, where a blowing temperature of the cooling ranges from 17° C. to 21° C., a blowing speed of the cooling ranges from 0.4 m/s to 0.5 m/s, a draw ratio ranges from 4 times to 5 times, and a winding tension ranges from 20 cN to 30 cN.

As a preferred solution of the fabrication method of the cut-resistant multifunctional melt-spun composite fiber according to the present disclosure, a fabrication method of the masterbatch A includes:

mixing, stirring and heating the carrier particle, porous zeolite powder and carbon nanotube powder at a temperature ranges from 50° C. to 70° C.; putting an obtained mixture into a twin screw extruder for extrusion at a temperature ranges from 250° C. to 300° C.; performing cooling, drying, granulating and sieving to obtain the masterbatch A. A total content of the porous zeolite and the carbon nanotube is 10% to 20% of the masterbatch A, and a usage ratio of the porous zeolite to the carbon nanotube ranges from 2:1 to 2:3.

A fabrication method of the masterbatch B includes:

mixing, stirring and heating the carrier particle and ultra-high molecular weight polyethylene microfiber powder at a temperature ranges from 30° C. to 50° C.; putting an obtained mixture into a twin screw extruder for extrusion at a temperature ranges from 80° C. to 100° C.; performing cooling, drying, granulating and sieving to obtain the masterbatch B. A total content of the ultra-high molecular weight polyethylene microfiber is 5% to 15% of the masterbatch B.

The carrier particle includes one of the PET particle, or the polypropylene particle.

Yet another objective of the present disclosure is to provide application of a cut-resistant multifunctional melt-spun composite fiber to fabrication of cut-resistant textiles.

The present disclosure has the following beneficial effects.

(1) According to the present disclosure, a conventional melt-spun fiber is taken as a fiber substrate, and a cut-resistant function of the fiber is achieved through mutual synergy of the added composite functional substrate. Selection of a cut-resistant substrate in the prior art is expanded, and the production cost of products is reduced.

(2) In the present disclosure, the porous zeolite, the carbon nanotube and the ultra-high molecular weight polyethylene microfiber are taken as a composite functional substrate. A special crystal structure of the porous zeolite in the fiber allows the fiber to have a larger stress field and stronger adsorption performance on vapor molecules in an environment. The carbon nanotube has excellent electrical conductivity, endowing the fiber with an antistatic effect, while a tubular structure of the carbon nanotube effectively reduces material density, such that light weight of the fiber is achieved. Finally, the ultra-high molecular weight polyethylene microfiber selected in the present disclosure can improve fiber strength and performance stability, forming a synergistic effect together with the porous zeolite and the carbon nanotube, resulting in a fiber product has diversified functions.

(3) When the ultra-high molecular weight polyethylene microfiber forms a continuous network structure, the porous zeolite and the carbon nanotube can be captured by the molecular network, forming a stable cut-resistant system, thereby avoiding the loss of a functional substrate during subsequent washing process and preventing weakening of functionality.

BRIEF DESCRIPTION OF DRAWINGS

In order to explain the technical solutions in examples of the present disclosure more clearly, the accompanying drawings required in the description of the examples will be described below briefly. Apparently, the accompanying drawings in the following description show merely some examples of the present disclosure, and other drawings can be derived from these accompanying drawings by those of ordinary skill in the art without creative efforts. In the figures:

FIG. 1 is a schematic structural diagram of a multifunctional melt-spun composite fiber fabricated according to Embodiment 1 of the present disclosure.

DETAILED DESCRIPTION OF THE EMBODIMENTS

To make the foregoing objective, features, and advantages of the present disclosure clearer and more comprehensible, the specific embodiments of the present disclosure will be described in detail below in conjunction with the embodiments of the specification.

In the following description, numerous concrete details are set forth in order to provide a thorough understanding of the present disclosure. However, the present disclosure may be implemented otherwise than as specifically described herein. Those skilled in the art can make similar developments without departing from the spirit of the present disclosure, and therefore the present disclosure is not to be limited by the specific embodiments disclosed below.

Second, reference herein to "an example", "an embodiment", "embodiments" or "examples" means a particular feature, structure, or characteristic which may be included in in at least one implementation of the present disclosure. The appearances of "in an embodiment" in various places throughout this specification are not all referring to the same embodiment, nor are separate or alternative embodiments mutually exclusive of other embodiments.

Raw materials used in the present disclosure are commercially available in the art without special description.

An ultra-high molecular weight polyethylene microfiber used in the specific embodiments are a commercially available ultra-high molecular weight polyethylene fiber. The ultra-high molecular weight polyethylene microfiber is cut using a fiber cutting apparatus and forms microfiber powders having the following characteristics:

microfiber length: 20 μm-40 μm, diameter: 2 μm-4 μm; and degree of molecular polymerization: 1.5 million-3 million.

Porous zeolite is clinoptilolite powder, is purchased from Guotou Shengshi (Beijing) Technology Co., Ltd., and has a particle size of 2000 mesh.

A carbon nanotube is a double-walled carbon nanotube purchased from Jiangsu XFNANO Materials Tech Co., Ltd, with an item number XFM01, has a diameter of 2 nm-4 nm, a length of 20 μm-40 μm, and a volume resistivity ≤100Ω, and is powder.

A polyethylene terephthalate (PET) particle is purchased from Changzhou Huarun Composite Materials Co., Ltd., with an item number CR-8863.

A polypropylene particle is purchased from LCY, Taiwan, with an item number Globalene® 6181.

A fiber filament fabricated by the present disclosure is woven through a glove machine to obtain 15-needle functional gloves for subsequent performance detection. Performance test methods includes:

a cut-resistant test refers to standard ANSI/ISEA 105;
a humidity control test refers to standard ASTM D2654-89a;
an antistatic test refers to standard EN1149-1;
a fiber strength test refers to standard GBT 19975-2005; and
a washing fastness test refers to standard GB/T12490-2014.

Embodiment 1

The embodiment provided a fabrication method of a cut-resistant multifunctional melt-spun composite fiber. The fabrication method specifically included:

1) A masterbatch A containing porous zeolite and a carbon nanotube was fabricated by taking a PET particle as a masterbatch carrier:

The PET particle, porous zeolite powder and carbon nanotube powder were added into a stirring container, heated to 60° C., and uniformly stirred and mixed at a stirring speed of 1000 r/min, and a mixture was obtained.

The mixture was put into a twin screw extruder for extrusion at an extrusion temperature of 270° C., and was cooled, dried, granulated and sieved to obtain the masterbatch A, where a total content of the porous zeolite and the carbon nanotube in the masterbatch A was 15%, and a ratio of the porous zeolite to the carbon nanotube was 1:1.

A masterbatch B containing an ultra-high molecular weight polyethylene microfiber was fabricated by taking a PET particle as a masterbatch carrier:

The PET particle and ultra-high molecular weight polyethylene microfiber powder were added into a stirring container, heated to 40° C., and uniformly stirred and mixed at a stirring speed of 1000 r/min, and a mixture was obtained.

The mixture was put into a twin screw extruder for extrusion at an extrusion temperature of 90° C., and was cooled, dried, granulated and sieved to obtain the masterbatch B, where a total content of the ultra-high molecular weight polyethylene microfiber in the masterbatch B was 10%, and a melting point of the used PET particle was 85° C.

The multifunctional melt-spun composite fiber was fabricated:

A composite functional substrate accounted for 2% of a total content of the multifunctional melt-spun composite fiber. A ratio of a using amount of the ultra-high molecular weight polyethylene microfiber to a total use amount of the porous zeolite and the carbon nanotube was 3:1. A use ratio of the porous zeolite and the carbon nanotube was 1:1. Specifically:

The PET particle, the masterbatch A and the masterbatch B were stirred for 15 min at 60° C. at a stirring speed of 500 r/min and uniformly mixed, where a blending ratio was that the total content of the composite functional substrate (the porous zeolite, the carbon nanotube and the ultra-high molecular weight polyethylene microfiber) in a final fiber was controlled to be 2%, the total content of the porous zeolite and the carbon nanotube was 0.5%, the ratio of the porous zeolite to the carbon nanotubes was 1:1, and a content of the ultra-high molecular weight polyethylene microfiber was 1.5%.

The uniformly mixed particles were added into a polymer hopper, extruded by a twin screw extruder at 270° C., and cooled, drawn and wound to obtain a finished filament, where a cooling blowing temperature was 19° C., a cooling blowing speed was 0.4 m/s, a draw ratio was 4 times, winding tension was 20 cN, and a winding speed was 2000 m/min. The fiber filament obtained in the embodiment had a specification of 400 D.

Embodiment 2

A difference between this embodiment and Embodiment 1 laid in adjusting a content and proportion of the composite functional substrate in the multifunctional melt-spun composite fiber, and reference was made to Embodiment 1 for remaining process steps. Specifically:

The multifunctional melt-spun composite fiber was fabricated:

A composite functional substrate accounted for 1% of a total content of the multifunctional melt-spun composite fiber. A ratio of a using amount of the ultra-high molecular weight polyethylene microfiber to a total use amount of the porous zeolite and the carbon nanotube was 4:1. A use ratio of the porous zeolite and the carbon nanotube was 1:1. Specifically:

The PET particle, the masterbatch A containing the porous zeolite and the carbon nanotube, and the masterbatch B containing the ultra-high molecular weight polyethylene microfiber were stirred for 15 min at 60° C. at a stirring speed of 500 r/min and uniformly mixed, where a blending ratio was that the total content of the composite functional substrate (the porous zeolite, the carbon nanotube and the ultra-high molecular weight polyethylene microfiber) in a final fiber was controlled to be 1%, the total content of the porous zeolite and the carbon nanotube was 0.2%, the ratio of the porous zeolite to the carbon nanotubes was 1:1, and a content of the ultra-high molecular weight polyethylene microfiber was 0.8%.

The uniformly mixed particles were added into a polymer hopper, extruded by a twin screw extruder at 270° C., and cooled, drawn and wound to obtain a finished filament, where a cooling blowing temperature was 20° C., a cooling blowing speed was 0.4 m/s, a draw ratio is 5 times, winding tension was 30 cN, and a winding speed was 3000 m/min. The fiber filament of the embodiment was obtained.

Embodiment 3

A difference between this embodiment and Embodiment 1 laid in adjusting a content and proportion of the composite functional substrate in the multifunctional melt-spun composite fiber, and reference was made to Embodiment 1 for remaining process steps. Specifically:

The multifunctional melt-spun composite fiber was fabricated:

A composite functional substrate accounted for 0.6% of a total content of the multifunctional melt-spun composite fiber. A ratio of a using amount of the ultra-high molecular weight polyethylene microfiber to a total use amount of the porous zeolite and the carbon nanotube was 5:1. A use ratio of the porous zeolite and the carbon nanotube was 1:1. Specifically:

The PET particle, the masterbatch A containing the porous zeolite and the carbon nanotube, and the masterbatch B containing the ultra-high molecular weight polyethylene microfiber were stirred for 15 min at 60° C. at a stirring speed of 500 r/min and uniformly mixed, where a blending ratio was that the total content of the composite functional substrate (the porous zeolite, the carbon nanotube and the ultra-high molecular weight polyethylene microfiber) in a final fiber was controlled to be 0.6%, the total content of the porous zeolite and the carbon nanotube was 0.1%, the ratio of the porous zeolite to the carbon nanotubes was 1:1, and a content of the ultra-high molecular weight polyethylene microfiber was 0.5%.

The uniformly mixed particles were added into a polymer hopper, extruded by a twin screw extruder at 270° C., and cooled, drawn and wound to obtain a finished filament, where a cooling blowing temperature was 20° C., a cooling blowing speed was 0.4 m/s, a draw ratio was 5 times, winding tension was 30 cN, and a winding speed was 3000 m/min. The fiber filament of the embodiment was obtained.

Embodiment 4

A difference between this embodiment and Embodiment 1 laid in adjusting a content and proportion of the composite functional substrate in the multifunctional melt-spun composite fiber, and reference was made to Embodiment 1 for remaining process steps. Specifically:

The multifunctional melt-spun composite fiber was fabricated:

A composite functional substrate accounted for 8% of a total content of the multifunctional melt-spun composite fiber. A ratio of a using amount of the ultra-high molecular weight polyethylene microfiber to a total use amount of the porous zeolite and the carbon nanotube was 3:1. A use ratio of the porous zeolite and the carbon nanotube was 1:1. Specifically:

The PET particle, the masterbatch A containing the porous zeolite and the carbon nanotube, and the masterbatch B containing the ultra-high molecular weight polyethylene microfiber were stirred for 15 min at 60° C. at a stirring speed of 500 r/min and uniformly mixed, where a blending ratio was that the total content of the composite functional substrate (the porous zeolite, the carbon nanotube and the ultra-high molecular weight polyethylene microfiber) in a final fiber was controlled to be 8%, the total content of the porous zeolite and the carbon nanotube was 2%, the ratio of the porous zeolite to the carbon nanotubes was 1:1, and a content of the ultra-high molecular weight polyethylene microfiber was 6%.

The uniformly mixed particles were added into a polymer hopper, extruded by a twin screw extruder at 270° C., and cooled, drawn and wound to obtain a finished filament, where a cooling blowing temperature was 20° C., a cooling blowing speed was 0.4 m/s, a draw ratio was 5 times, winding tension was 30 cN, and a winding speed was 3000 m/min. The fiber filament of the embodiment was obtained.

Embodiment 5

A difference between this embodiment and Embodiment 1 laid in adjusting a content and proportion of the composite functional substrate in the multifunctional melt-spun composite fiber, and reference was made to Embodiment 1 for remaining process steps. Specifically:

The multifunctional melt-spun composite fiber was fabricated:

A composite functional substrate accounted for 10% of a total content of the multifunctional melt-spun composite fiber. A ratio of a using amount of the ultra-high molecular weight polyethylene microfiber to a total use amount of the porous zeolite and the carbon nanotube was 4:1. A use ratio of the porous zeolite and the carbon nanotube was 1:1. Specifically:

The PET particle, the masterbatch A containing the porous zeolite and the carbon nanotube, and the masterbatch B containing the ultra-high molecular weight polyethylene microfiber were stirred for 15 min at 60° C. at a stirring speed of 500 r/min and uniformly mixed, where a blending ratio was that the total content of the composite functional substrate (the porous zeolite, the carbon nanotube and the ultra-high molecular weight polyethylene microfiber) in a final fiber was controlled to be 10%, the total content of the porous zeolite and the carbon nanotube was 2%, the ratio of the porous zeolite to the carbon nanotubes was 1:1, and a content of the ultra-high molecular weight polyethylene microfiber was 8%.

The uniformly mixed particles were added into a polymer hopper, extruded by a twin screw extruder at 270° C., and cooled, drawn and wound to obtain a finished filament, where a cooling blowing temperature was 20° C., a cooling blowing speed was 0.4 m/s, a draw ratio was 5 times, winding tension was 30 cN, and a winding speed was 3000 m/min. The fiber filament of the embodiment was obtained.

Comparative Example 1

A difference between the comparative example and Embodiment 1 laid in that in a step of fabricating the multifunctional melt-spun composite fiber, only the masterbatch B containing an ultra-high molecular weight polyethylene microfiber was added, that is, the composite functional substrate was only the ultra-high molecular weight polyethylene microfiber with a total content of 2%, reference was made to Embodiment 1 for remaining step processes, and a fiber filament of the comparative example was obtained.

Comparative Example 2

A difference between the comparative example and Embodiment 1 laid in that only porous zeolite was added in a step of fabricating the multifunctional melt-spun composite fiber, that is, the composite functional substrate was only the porous zeolite with a total content of 2%, reference was made to Embodiment 1 for remaining step processes, and a fiber filament of the comparative example was obtained.

Comparative Example 3

A difference between the comparative example and Embodiment 1 laid in that only a carbon nanotube was added in a step of fabricating the multifunctional melt-spun composite fiber, that is, the composite functional substrate was only the carbon nanotube with a total content of 2%, reference was made to Embodiment 1 for remaining step processes, and a fiber filament of the comparative example was obtained.

Comparative Example 4

A difference between the comparative example and Embodiment 1 laid in that only porous zeolite and a carbon nanotube are added in a step of fabricating the multifunctional melt-spun composite fiber, that is, the composite functional substrate was only the porous zeolite and the carbon nanotube with a total content of 2%, a use ratio was 1:1, reference was made to Embodiment 1 for remaining step processes, and a fiber filament of the comparative example was obtained.

The fiber filaments fabricated in Embodiments 1-5 and Comparative Embodiments 1-4 are made into 15-needle functional gloves, and relevant performance tests are carried out with reference to the above standards. Results are shown in Table 1.

TABLE 1

|  | Cut-resistant grade | Water content | Surface resistivity | Strength cN/dtex | Washing fastness |
|---|---|---|---|---|---|
| Embodiment 1 | A5 | 6.8% | $2.0 * 10^7 \, \Omega$ | 28.6 | 95% |
| Embodiment 2 | A4 | 7.1% | $3.7 * 10^7 \, \Omega$ | 24.3 | 88% |
| Embodiment 3 | A3 | 1.5% | $4.0 * 10^{10} \, \Omega$ | 20.1 | 85% |
| Embodiment 4 | A5 | 3.2% | $2.2 * 10^7$ | 25.9 | 80% |
| Embodiment 5 | A4 | 6.4% | $3.1 * 10^7 \, \Omega$ | 25.8 | 72% |
| Comparative example 1 | <A1 | 0.04% | $4.5 * 10^{12} \, \Omega$ | 17.8 | 43% |
| Comparative example 2 | <A1 | 2.8% | $2.1 * 10^{12} \, \Omega$ | 10.4 | 31% |
| Comparative example 3 | A1 | 0.06% | $4.0 * 10^{10} \, \Omega$ | 18.5 | 46% |
| Comparative example 4 | A1 | 3.4% | $6.2 * 10^{11} \, \Omega$ | 15.1 | 51% |

(Note:
The washing fastness is measured by a resistivity retention rate after washing for 10 times)

It can be seen from Table 1 that with an increase in the total amount of composite functional substrate, overall performance of the fiber increases first and then decreases. An appropriate amount of a functional substrate can enhance the structure of the fiber and form an effective stress transmission and dispersion mechanism. Too high an addition amount may lead to an increase in internal stress of the fiber, an original fiber structure is influenced, and system stability decreases, such that performance of the fiber is reduced. Fibers with better comprehensive performance can be obtained within an addition range of the present disclosure.

When only the ultra-high molecular weight polyethylene microfiber, the porous zeolite and the carbon nanotube are added in the comparative examples, the overall performance of the fiber decreases obviously. This is because in the solution of the present disclosure, the ultra-high molecular weight polyethylene microfiber provides strength and stability for the fiber with a high molecular weight and excellent mechanical properties, and further forms a continuous network structure. The porous zeolite and the carbon nanotube can be captured by the molecular network to form a stable system, such that loss of a functional substrate in a subsequent washing process and weakening of functionality are avoided.

Embodiment 6

The embodiment was configured to investigate an influence of a ratio of the use amount of the ultra-high molecular weight polyethylene microfiber to the total use amount of the porous zeolite and the carbon nanotube in the composite substrate on the performance of the fabricated fiber. A difference from Embodiment 1 laid in adjusting a ratio of the use amount of the ultra-high molecular weight polyethylene microfiber to the total use amount of the porous zeolite and the carbon nanotube in step 3) of Embodiment 1 to 1:1, 5:1, and 7:1, and reference was made to Embodiment 1 for remaining step process. A fiber filament fabricated in the embodiment was made into 15-needle functional gloves for relevant performance tests with reference to the above standards. Compared with 3:1 of Embodiment 1, results are shown in Table 2.

TABLE 2

| Ratio | Cut-resistant grade | Water content | Surface resistivity | Strength cN/dtex | Washing fastness |
|---|---|---|---|---|---|
| 3:1 | A5 | 6.8% | $2.0 * 10^7 \, \Omega$ | 28.6 | 95% |
| 1:1 | A2 | 7.1% | $4.1 * 10^7 \, \Omega$ | 18.3 | 72% |
| 5:1 | A5 | 3.4% | $6.8 * 10^8 \, \Omega$ | 26.7 | 86% |
| 7:1 | A5 | 1.1% | $3.2 * 10^{11} \, \Omega$ | 24.9 | 81% |

It can be seen from Table 2 that the ratio of the use amount of the polyethylene microfiber to the total use amount of the porous zeolite and the carbon nanotube in the solution of the present disclosure has a significant influence on the fiber performance, too high a ratio of the ultra-high molecular weight polyethylene microfiber may lead to too dense a network structure, thereby limiting uniform distribution of the porous zeolite and the carbon nanotube in the fiber. Too low a ratio of the porous zeolite and the carbon nanotube may lead to a significant decrease in water content and antistatic effect. The ratio of the ultra-high molecular weight polyethylene microfiber is too low to form a stable structure, and a functional substrate is prone to lose during washing, resulting in functional weakening.

Embodiment 7

The embodiment was configured to investigate an influence of a ratio of the porous zeolite and the carbon nanotube in the composite substrate on the performance of the fabricated fiber. A difference from Embodiment 1 laid in adjusting a use ratio of the porous zeolite and the carbon nanotube in step 1) and 3) of Embodiment 1 to 3:1, 4:1, and 1:2, and reference was made to Embodiment 1 for remaining step process. A fiber filament fabricated in the embodiment was made into 15-needle functional gloves for relevant performance tests with reference to the above standards. Compared with 1:1 of Embodiment 1, results are shown in Table 3.

TABLE 3

| Ratio | Cut-resistant grade | Water content | Surface resistivity | Strength cN/dtex | Washing fastness |
|---|---|---|---|---|---|
| 1:1 | A5 | 6.8% | $2.0 * 10^7 \, \Omega$ | 28.6 | 95% |
| 3:1 | A5 | 7.3% | $5.7 * 10^8 \, \Omega$ | 26.1 | 89% |
| 4:1 | A4 | 7.5% | $9.5 * 10^8 \, \Omega$ | 20.2 | 75% |
| 1:2 | A4 | 4.2% | $1.5 * 10^7 \, \Omega$ | 19.8 | 72% |

It can be seen from Table 3 that the ratio of the porous zeolite and the carbon nanotube in the composite substrate has a significant influence on the performance of the fabricated fibers. The porous zeolite and the carbon nanotube can generate a complementary effect in the fiber. Adsorption performance provided by the zeolite can be combined with conductivity of the carbon nanotube, such that the fiber has a desirable antistatic effect while maintaining a certain water content. In a case that a zeolite content is too high, it may cause the water content of the fiber to be too high, influencing conductivity and cut resistance of the fiber. In a case that a carbon nanotube content is too high, it may cause the conductivity of the fiber to be too high, but sacrifice part of the adsorption performance and strength. Therefore, optimizing the ratio of the porous zeolite and the carbon nanotube is one of the keys to fabricate the cut-resistant multifunctional melt-spun composite fiber.

Comparative Example 5

A difference between the comparative example and Example 1 laid in that the ultra-high molecular weight polyethylene microfiber in the composite functional substrate was adjusted to a silicon carbide whisker, reference was made to Example 1 for remaining step processes, and a fiber filament of the comparative example was obtained.

Comparative Example 6

A difference between the comparative example and Example 1 laid in that the ultra-high molecular weight polyethylene microfiber in the composite functional substrate was adjusted to a ceramic fiber, reference was made to Example 1 for remaining step processes, and a fiber filament of the comparative example was obtained.

Comparative Example 7

A difference between the comparative example and Example 1 laid in that the carbon nanotube in the composite functional substrate was adjusted to graphene, reference was made to Example 1 for remaining step processes, and a fiber filament of the comparative example was obtained.

Comparative Example 8

A difference between the comparative example and Example 1 laid in that the porous zeolite in the composite functional substrate was adjusted to calcium alginate, reference was made to Example 1 for remaining step processes, and a fiber filament of the comparative example was obtained.

The fiber filaments fabricated in Comparative examples 5-8 are made into 15-needle functional gloves, and relevant performance tests are carried out with reference to the above standards and compared with Example 1. Results are shown in Table 4.

TABLE 4

| | Cut-resistant grade | Water content | Surface resistivity | Strength cN/dtex | Washing fastness |
|---|---|---|---|---|---|
| Example 1 | A5 | 6.8% | $2.0 * 10^7 \Omega$ | 28.6 | 95% |
| Comparative example 5 | A4 | 5.4% | $4.8 * 10^8 \Omega$ | 20.9 | 60% |
| Comparative example 6 | A4 | 3.1% | $7.1 * 10^8 \Omega$ | 21.5 | 61% |
| Comparative example 7 | A4 | 5.8% | $2.8 * 10^8 \Omega$ | 24.5 | 75% |
| Comparative example 8 | A3 | 4.9% | $1.1 * 10^9 \Omega$ | 19.5 | 68% |

It can be seen from Table 4 that, in combination modes of various functional substrates, the fiber obtained by using the ultra-high molecular weight polyethylene microfiber, the carbon nanotube and the porous zeolite as a composite functional substrate has the best performance. When the ultra-high molecular weight polyethylene microfiber is replaced by other hard fibers, although certain cut resistance and mechanical properties exists, the overall performance is significantly reduced due to structural differences. For example, the silicon carbide whisker is prone to form a stress concentration point in the fiber, so as to damage interaction between the carbon nanotube and the porous zeolite, and further lead to decline of the overall performance. Furthermore, in a process of washing, the silicon carbide whisker may fall off or fracture from the fiber, resulting in structural damage. A rigid structure of the ceramic fiber may limit free movement and adsorption performance of the zeolite in the fiber, thus influencing the overall performance.

Although the graphene also has desirable conductivity, its lamellar structure is not as dispersible and interfacial bonding as the carbon nanotube in the substrate, and may form stacking in the fiber, then lead to an increase in density of the fiber, a decrease in toughness, and an influence on water absorption and a water retention capacity of the fiber. Moreover, weak interaction between the graphene and the porous zeolite may also be destroyed in washing, and then washing resistance may be influenced.

Although the calcium alginate has a high water absorption and water retention capacity, a distribution and binding state of the calcium alginate in the fiber influences the overall water content. The calcium alginate is prone to form a loose structure in the fiber, and is more likely to deform and fracture under the action of an external force, and then the overall performance is influenced.

In summary, the present disclosure takes the porous zeolite, the carbon nanotube and the ultra-high molecular weight polyethylene microfiber as the composite functional substrate. The porous zeolite, the carbon nanotube and the ultra-high molecular weight polyethylene microfiber form a synergistic effect, and an obtained fiber product has diversified function. When the ultra-high molecular weight polyethylene microfiber generates a continuous network structure, the porous zeolite and the carbon nanotube can be captured by the molecular network to form a stable cut-resistant system, such that loss of a functional substrate in a subsequent washing process and weakening of functionality are avoided. According to the present disclosure, a conventional melt-spun fiber is taken as a fiber substrate, a cut-resistant function of the fiber is achieved through mutual synergy of the added composite functional substrate, selection of a cut-resistant substrate in the prior art is expanded, and the production cost of products is reduced.

It should be noted that the above-mentioned examples are merely intended for description of the technical solutions of the present disclosure rather than limitation of the present disclosure. Although the present disclosure is described in detail with reference to the preferred examples, those of ordinary skill in the art should understand that they may still make modifications or equivalent replacements to the technical solutions of the present disclosure without departing from the spirit and scope of the technical solutions of the present disclosure, all of which should be encompassed within the scope of the claims of the present disclosure.

What is claimed is:

1. A cut-resistant multifunctional melt-spun composite fiber, having a flexible network structure, and comprising:
   i. a composite functional material comprising:
      a porous zeolite, wherein a crystal structure of the porous zeolite in the multifunctional melt-spun composite fiber allows the multifunctional melt-spun composite fiber to adsorb vapor molecules in an environment;
      a carbon nanotube, wherein the carbon nanotube has electrical conductivity and endows the multifunctional melt-spun composite fiber with an antistatic effect, and a tubular structure of the carbon nanotube reduces material density of the multifunctional melt-spun composite fiber; and an ultra-high molecular weight polyethylene microfiber for improving fiber strength and performance stability and forming a synergistic effect together with the porous zeolite and the carbon nanotube; and ii. a main fiber material comprising a melt-spun fiber, wherein the melt-spun fiber comprises one of polyester, polyethylene, polypropylene, or polyamide;

wherein the multifunctional melt-spun composite fiber is a combination of two different polymers formed from the ultra-high molecular weight polyethylene microfiber and the melt-spun fiber, with additives comprising the porous zeolite and the carbon nanotubes, which are melt-spun and extruded to obtain the cut-resistant multifunctional melt-spun composite fiber;

wherein a total content of the composite functional material accounts for 0.5 wt % to 10 wt % of the multifunctional melt-spun composite fiber.

2. The cut-resistant multifunctional melt-spun composite fiber according to claim 1, wherein, in the composite functional material, a weight ratio of an amount of the ultra-high molecular weight polyethylene microfiber to a total amount of the porous zeolite and the carbon nanotube ranges from 2:1 to 5:1, based on amount used to prepare the multifunctional melt-spun composite fiber.

3. The cut-resistant multifunctional melt-spun composite fiber according to claim 1, wherein a weight ratio of the porous zeolite to the carbon nanotube in the composite functional material ranges from 1:1 to 3:1, based on amount used to prepare the multifunctional melt-spun composite fiber.

4. The cut-resistant multifunctional melt-spun composite fiber according to claim 2, wherein the ultra-high molecular weight polyethylene microfiber has a diameter of from 2 μm to 4 μm, a length of from 20 μm to 40 μm, a degree of molecular polymerization of from 1.5 million to 3 million, and a melting point of from 130° C. to 136° C.

5. The cut-resistant multifunctional melt-spun composite fiber according to claim 3, wherein a particle size of the porous zeolite ranges from 2000 mesh to 2500 mesh.

6. The cut-resistant multifunctional melt-spun composite fiber according to claim 3, wherein the carbon nanotube has a diameter of from 2 nm to 4 nm, a length of from 20 μm to 40 μm, and a volume resistivity ≤100 Ω.

7. A fabrication method of the cut-resistant multifunctional melt-spun composite fiber according to claim 1, wherein the multifunctional melt-spun composite fiber is obtained by blending and melt spinning a masterbatch A containing carrier particle, the porous zeolite and the carbon nanotube, and a masterbatch B containing carrier particle and the ultra-high molecular weight polyethylene microfiber, and the fabrication method comprises:

uniformly mixing the masterbatch A and the master batch B at a temperature of from 50° C. to 70° C. and obtain blended particles, wherein the carrier particle comprises one of a polyethylene terephthalate (PET) particle, or a polypropylene particle, and the step controls a total content of the composite functional material contained in the masterbatch A and the masterbatch B to be in a range of from 0.5 wt % to 10 wt % of the total content of the multifunctional melt-spun composite fiber, and a content of the ultra-high molecular weight polyethylene microfiber in masterbatch B to be in a range of from 50 wt % to 85 wt % of total content of composite functional material; and adding the blended particles into a polymer hopper, extruding the blended particles using a twin-screw extruder at a temperature from 250° C. to 300° C., cooling, drawing, and winding the blended particles, and obtaining finished filaments, wherein a blowing temperature of the cooling ranges from 17° C. to 21° C., a blowing speed of the cooling ranges from 0.4 m/s to 0.5 m/s, and a draw ratio ranges from 4 times to 5 times, and a winding tension ranges from 20 cN to 30 cN.

8. The fabrication method of the cut-resistant multifunctional melt-spun composite fiber according to claim 7, wherein a fabrication method of the masterbatch A comprises:

mixing, stirring and heating the carrier particle, porous zeolite powder and carbon nanotube powder at a temperature of from 50° C. to 70° C. to obtain mixture A;

putting the obtained mixture A into a twin screw extruder for extrusion at a temperature of from 250° C. to 300° C.;

performing cooling, drying, granulating and sieving to obtain the masterbatch A, wherein a total content of the porous zeolite and the carbon nanotube is 10 wt % to 20 wt % of the masterbatch A, and a weight ratio of the porous zeolite to the carbon nanotube ranges from 2:1 to 2:3, and a fabrication method of the masterbatch B comprises:

mixing, stirring and heating the carrier particle and ultra-high molecular weight polyethylene microfiber powder at a temperature of from 30° C. to 50° C. to obtain mixture B;

putting the obtained mixture B into a twin screw extruder for extrusion at a temperature of from 80° C. to 100° C.;

performing cooling, drying, granulating and sieving to obtain the masterbatch B, wherein a total content of the ultra-high molecular weight polyethylene microfiber is 5 wt % to 15 wt % of the masterbatch B.

\* \* \* \* \*